United States Patent
Hora et al.

(10) Patent No.: US 7,706,825 B2
(45) Date of Patent: Apr. 27, 2010

(54) SYSTEM FOR EXCHANGING MAIL AMONG MEMBERS BELONGING TO GROUP

(75) Inventors: Masahiro Hora, Tokyo (JP); Kousei Itou, Tokyo (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 193 days.

(21) Appl. No.: 10/824,464

(22) Filed: Apr. 15, 2004

(65) Prior Publication Data
US 2004/0234045 A1 Nov. 25, 2004

(30) Foreign Application Priority Data
Apr. 16, 2003 (JP) .................... P2003-111832

(51) Int. Cl.
*H04W 4/00* (2009.01)
(52) U.S. Cl. .................. 455/519; 455/41.2; 455/414.1; 455/518
(58) Field of Classification Search ............. 455/413, 455/414.1, 41.2, 41.3, 412.1, 517–519; 379/177–187, 379/201.01
See application file for complete search history.

(56) References Cited

U.S. PATENT DOCUMENTS

| 7,047,030 | B2 * | 5/2006 | Forsyth ....................... 455/518 |
| 2001/0022780 | A1 * | 9/2001 | Mizutani et al. ............ 370/261 |
| 2002/0037736 | A1 * | 3/2002 | Kawaguchi et al. ......... 455/518 |
| 2002/0168992 | A1 * | 11/2002 | Eiden et al. .................. 455/518 |
| 2002/0169855 | A1 | 11/2002 | Maehiro |
| 2003/0070070 | A1 * | 4/2003 | Yeager et al. ............... 713/157 |
| 2006/0019702 | A1 * | 1/2006 | Anttila et al. ............ 455/556.1 |

FOREIGN PATENT DOCUMENTS

| EP | 1078667 | 2/2001 |
| EP | 1249969 | 10/2002 |
| EP | 1257110 | 11/2002 |
| EP | 1257144 | 11/2002 |
| JP | 2003-38858 | 2/2003 |
| WO | WO 01/65807 A2 * | 7/2001 |
| WO | 01/65807 | 9/2001 |
| WO | 03/039173 | 5/2003 |

* cited by examiner

Primary Examiner—Charles N Appiah
Assistant Examiner—Jaime M Holliday
(74) Attorney, Agent, or Firm—Greenblum & Bernstein, P.L.C.

(57) ABSTRACT

A cellular phone of a member, who newly joins a group, creates a member list including a group ID and profile of a leader, and transmits a participation contact mail including a profile of the corresponding new member to a cellular phone of the leader. The cellular phone of the leader adds the profile of the new member to a member list after receiving the participation contact mail. The participation contact mail is transferred to the cellular phones of other existing members registered in the member list. The cellular phones of the existing members add the profile of the new member to their member lists in response to the received contact mail and transmit their profiles to the cellular phone of the new member. The cellular phone of the new member adds the profiles of the existing members to the member list in response to the received participation contact mail.

30 Claims, 6 Drawing Sheets

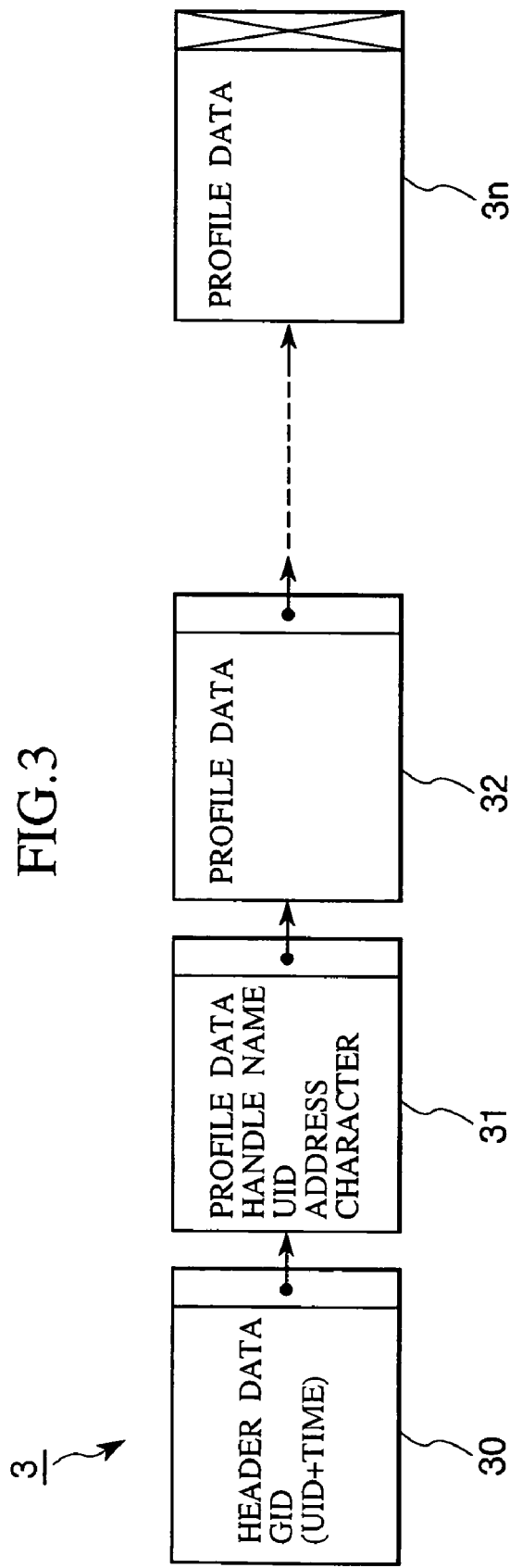

SYSTEM FOR EXCHANGING MAIL AMONG MEMBERS BELONGING TO GROUP

CROSS REFERENCE TO RELATED APPLICATION

The present disclosure relates to subject matter contained in Japanese Patent Application No. 2003-111832, filed on Apr. 16, 2003, the disclosure of which is expressly incorporated herein by reference in its entirety.

BACKGROUND OF THE INVENTION

1. Field of the Invention

The present invention relates to a technique for exchanging mail among members belonging to a group without passing through the server apparatus using terminal devices such as cellular phones.

2. Description of the Related Art

In accordance with development of recent information communication techniques, e-mail (hereinafter simply referred to as mail) is widely used as a means of communication. The mail is exchanged among members of the group in some cases. The following methods were conventionally used for exchanging mail among the members of the group.

In a first method, a list of group members is registered in a server apparatus on the Internet. Mail sent by any one of the members of the group is transmitted to other members of the group via the server apparatus. In a second method, a list of group members is registered in a terminal device of each member. Each member designates this list to send mail to other members.

In the first method, since the single list of the group members is placed in the server apparatus, mail transmitted by any member can be sent to all members without fail. The server apparatus manages the list of the group members and transmits mail to each member. However, the server apparatus needs neither list nor mail. Since maintenance and management of the server apparatus, which has no direct relation with the members of the group, are performed, each member has to pay a usage charge to use the server apparatus. When maintenance and management expenses are covered by advertising revenue, each member does not have to pay the usage charge. However, advertisement is attached to mail, which is transmitted to each group member, from the server apparatus. Moreover, advertising mails are sent to the members from the server apparatus, sometimes annoying the members.

In the second method, the list of group members is managed by the terminal device of each member of the group. Each member can transmit the mail to other members according to the list managed by his/her own terminal device. Actually, however, since each member has to manage the list manually, he/she sometimes finds the management annoying. When a member neglects to manage the list, his/her list may not be the same as the list managed by other members, especially if a new member joins the group or a member withdraws from the group. This caused problems in which the newly joined member does not receive mail from another member and the member, who already withdrew from the group, still receives mail from other members.

SUMMARY OF THE INVENTION

An object of the present invention is to provide a mail exchange system that can uniformly manage lists of members belonging to a group in multiple terminal devices to facilitate exchanging mail among group members without passing through a server.

In order to attain the above object, a mail exchange system according to a first aspect of the present invention includes multiple terminal devices connected to one another via a communications network. Each terminal device has a member information storage that stores member information of members, who belong to a group that exchanges mail. The plurality of terminal devices exchange mail with one another via the communications network. The plural terminal devices include a specific member terminal, an existing member terminal, and a newly joining member terminal. The specific member terminal includes a participation mail receiver that receives a participation mail, including member information of a member who newly joins the group, from the newly joining member terminal via the communications network. The specific member terminal further includes a first member information adder that extracts the member information included in the participation mail received by the participation mail receiver and stores the extracted member information in the member information storage. The specific member terminal further includes a new member information mail transmitter that transmits a new member mail, including the member information of the newly joining member, to the existing member terminal according to information stored in said member information storage via said communications network.

The existing member terminal includes a new member information mail receiver that receives the new member mail. The existing member terminal further includes a second member information adder that extracts the member information included in the received new member mail and stores the extracted member information in a member list in the member information storage. The existing member terminal further includes a self-information mail transmitter that transmits an existing member mail, including self-member information, to the newly joining member terminal via the communications network.

The newly joining member terminal includes a new participation mail transmitter that transmits the new member mail, including self-member information of the newly joining member, to the specific member terminal via said communications network. The newly joining member terminal further includes an existing member information mail receiver that receives the existing member mail. The newly joining member terminal further includes a member information generator that generates a member list stored in the member information storage based on the received existing member mail.

According to the aforementioned mail exchange system, in the specific member terminal, the member information of the newly joining member is added to the member information storage by the participation mail sent from the newly joining member terminal. In the existing member terminal, the member information of the newly joining member is added to the member information storage by the new member mail sent from the specific member terminal. In the newly joining member terminal, the member information storage is generated by the existing member mail sent from the existing member terminal. Accordingly, the contents of the member information storage are substantially uniform without using a server in the newly joining member terminal, the existing member terminal, and the specific member. In the above mail exchange system, since the contents of the member information storage in the terminal devices of all members of the group are substantially unified, the terminal device of each member can transmit mail to the terminal device of other members of the group without any omissions, even if a server is not provided therebetween.

In the aforementioned mail exchange system, the multiple terminal devices may further include a withdrawal mail transmitter that transmits mail, including information of withdrawal from the group, to the terminal devices of all members in a member list stored in said member information storage. The multiple terminal devices may further include a withdrawal mail receiver that receives the withdrawal mail, including the information of a withdrawing member, transmitted from the withdrawal mail transmitter of the terminal device of a withdrawing member. The multiple terminal devices may further include a member information deleter that deletes the member information of the withdrawing member from the member list in the mail member information storage.

Here, when each member withdraws from the group, the member information of the withdrawing member is deleted from the member list by the withdrawal mail sent from the terminal device of the withdrawing member in all terminal devices. The contents of the member information storage of the terminal devices are uniform in that the member information of the withdrawing member is excluded. This stops mail from other members of the group from reaching the terminal device of the withdrawing member, thereby preventing the withdrawing member from being annoyed with the unnecessary mail. Moreover, the mail is not transmitted via a server.

In order to attain the above object, a mail exchange terminal according to a second aspect of the present invention exchanges mail with other mail exchange terminal devices via a communications network. The mail exchange terminal device includes a memory that stores a program and data, a processor that executes the program, and a communications device that performs communications with the other mail exchange terminal devices. The program stored in the memory causes the processor to store member information of the existing members, who belong to a group where mail is exchanged, in the memory in advance. The program further causes the communications device to receive a contact mail including member information of a member, who newly joins in the group, from another mail exchange terminal device via the communications network. The program further causes the processor to extract the member information included in the received contact mail to store the extracted member information to the memory. The program further causes the communications device to transmit mail including self-member information to the mail exchange terminal device of the newly joining member via the communications network.

In order to attain the above object, a mail exchange terminal device according to a third aspect of the present invention exchanges mail with other mail exchange terminal devices via a communications network. The mail exchange terminal device includes a memory that stores a program and data, a processor that executes the program, and a communications device that performs communications with the other mail exchange terminal devices. The program stored in the memory causes the processor to store member information of the existing members, who belong to a group where mail is exchanged, in the memory in advance. The program further causes the communications device to receive a contact mail including member information of a member, who newly joins in the group, from the mail exchange terminal device of the newly joining member via the communications network. The program further causes the processor to extract the member information included in the received contact mail to store the extracted member information to the memory. The program further causes the communication device to transmit mail including the member information of the newly joining member to the mail exchange terminal device of the existing member stored in the memory from the communications device via the communications network according to the received contact mail.

In order to attain the above object, a mail exchange terminal device according to a fourth aspect of the present invention exchanges mail with other mail exchange terminal devices via a communications network. The mail exchange terminal device includes a memory that stores a program and data, a processor that executes the program, and a communications device that performs communications with the other mail exchange terminal devices. The program stored in the memory causes the processor to cause the communications device to receive an invitation mail for inviting participation in a group, which is already formed by users of other mail exchange terminal devices, from another mail exchange terminal device of a specific member via the communications network. The program further causes the communications device to transmit mail, including self-member information of a newly joining member, to the mail exchange terminal device of the specific member via the communications network at the time of joining in the group where participation was invited by the received mail. The program further causes the communications device to receive contact mails, which are transmitted from the mail exchange terminal devices of other existing members via the communications network, according to the mail transmitted to the mail exchange terminal device of the specific member and includes member information of other existing member. The program further stores member information of a member, who belongs to the group, in the memory based on the received invitation mail and the received contact mail.

In order to attain the above object, a mail exchange terminal device according to a fifth aspect of the present invention exchanges mail with other mail exchange terminal devices via a communications network. The mail exchange terminal device includes a memory that stores a program and data, a processor that executes the program, and a communications device that performs communications with the other mail exchange terminal devices. The program stored in the memory causes the processor to store member information of the existing members, who belong to a group where mail is exchanged, in the memory in advance. The program further causes the communications device to transmit mail to the mail exchange terminal device of other members, who belong to the group, via the communications network according to the member information stored in the memory. The program further causes the communications device to transmit a withdrawal mail including information of withdrawal from the group to the mail exchange terminal devices of all other members according to the member information stored in the memory via the communications network. The program further causes the communications device to receive a withdrawal mail including information, which indicates that another member withdraws from the group, from another mail exchange terminal device via the communications network. The program further causes the processor to delete member information of the withdrawing member from the memory.

The program stored in the memory can be recorded on a computer-readable storage medium. This computer-readable storage medium may be a storage medium, which is structured to be attachable and detachable to and from the computer apparatus. This computer-readable storage medium may be a storage medium such as a fixed disk apparatus, which is provided in the computer apparatus and provided together with the computer apparatus. The program stored in the memory in the mail exchange terminal device can be distributed via a network from the server apparatus existing on the network after superimposing the data signal of the program on a carrier wave.

In order to attain the above object, a mail exchange method according to a sixth aspect of the present invention is a method for exchanging mail among terminal devices connected to one another via a communications network. Each terminal device has a member information memory that stores member information of members, who belong to a group where mail is exchanged. The method causes the terminal device of the newly joining member to transmit mail, including member information of a member, who newly joins in the group, to the terminal device of one specific member via the communications network. The method further causes the terminal device of the specific member to receive the mail, including the member information of the newly joining member. The method further causes the terminal device of the specific member to extract the member information of the newly joining member from the mail received from the terminal device of the newly joining member and store the extracted member information to the memory. The method further causes the terminal device of the specific member to transmit the mail, including the member information of the newly joining member, to the terminal devices of other existing members via the communications network according to the member information stored in the memory of the terminal device of the specific member. The method further causes the plurality of terminal devices of the other existing members to receive the mail including the member information of the newly joining member. The method further causes the terminal devices of the other existing members to extract the member information of the newly joining member from the mail received from the terminal device of one specific member and store the extracted member information in the memory. The method further causes the terminal devices of the other existing members to transmit the mail, including the member information of the other existing members to the terminal device of the newly joining member via the communications network. The method further causes the terminal device of the newly joining member to receive the mail including the member information of the other existing members transmitted from the terminal device of the existing member. The method further causes the terminal device of the newly joining member to extract the member information of the other existing members from the mail received from the terminal devices of the other existing members and store the extracted member information in the memory.

The mail exchange method may further cause an arbitrary terminal device to transmit mail including information, indicating that the member corresponding to the arbitrary terminal device is withdrawing from the group, to all other terminal devices. The method may further cause each of the other terminal devices to receive the mail, indicating the withdrawal sent from the arbitrary terminal device. The method may further cause each of the other terminal devices to delete the member information corresponding to the withdrawing member from the member information storage.

BRIEF DESCRIPTION OF THE DRAWINGS

FIG. 3 is a view illustrating a member list managed in a cellular phone of each member of a "Fellowship";

DETAILED DESCRIPTION OF PREFERRED EMBODIMENT

An embodiment of the present invention will be specifically described with reference to the drawings.

Figure 1:
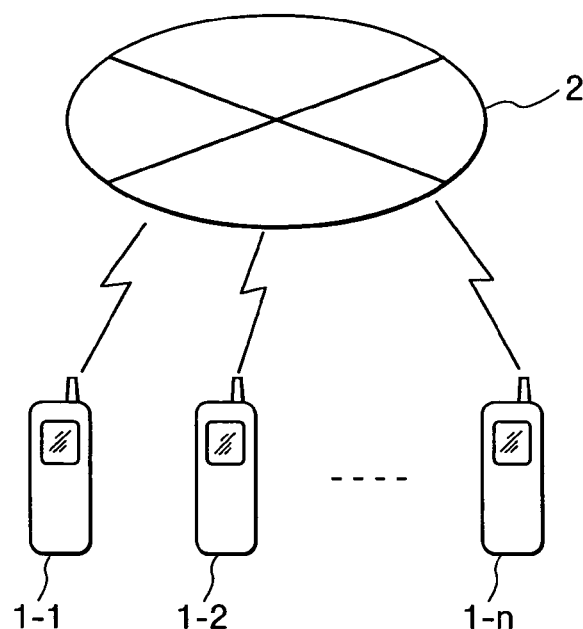
FIG. 1 is a view illustrating a network system applied to a mail exchange system according to an embodiment of the present invention.

FIG. 1 is a view illustrating a network system applied to a mail exchange system according to the present embodiment. As illustrated in this figure, this network system includes multiple cellular phones 1 (1-1 to 1-n) connected to one another via a communications network 2 including a cellular phone network and the Internet. In this network system, mail is exchanged among the cellular phones 1 without passing through the server apparatus.

In this mail exchange system, a user of any one of the cellular phones 1 becomes a leader of a "Fellowship." The "Fellowship" refers to a group formed by members, who exchange mail in this exchange system. A leader invites a user of another cellular phone 1 to join in the "Fellowship" as a member. The invited user sends mail showing that he/she joins in the "Fellowship" to the leader and becomes a member. The members of the "Fellowship" that is formed by the users of the multiple cellular phones 1 are uniformly managed in the cellular phones 1 of the respective members according to a member list to be described later.

When a member of the "Fellowship" transmits mail to another member, he/she sends broadcast mail according to the member list managed in his/her own cellular phone 1. Only cellular phones 1 of the respective members are used to exchange mail among the members of the "Fellowship," and no server apparatus is needed. Even when a new member joins in the "Fellowship" or a member withdraws from the "Fellowship," the member list is uniformly managed by only exchanging mail among the cellular phones 1 of the respective members (including a newly joining member and a withdrawn member). In order to manage the member list, only cellular phones 1 of the respective members are used and no server apparatus is needed.

Figure 2:
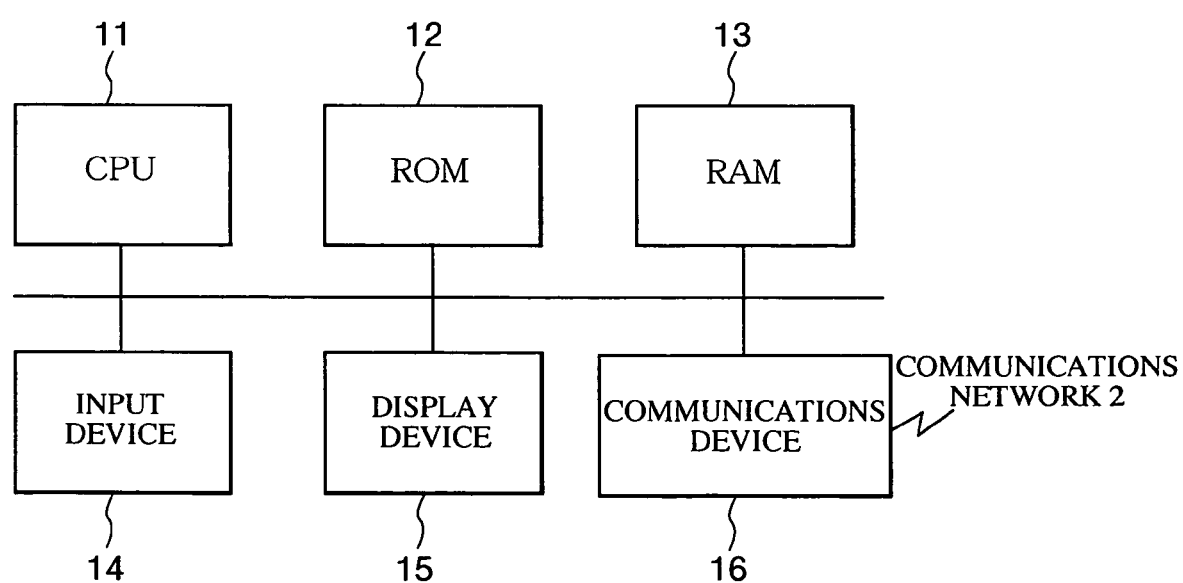
FIG. 2 is a block diagram illustrating a configuration of a cellular phone of FIG. 1.

FIG. 2 is a view illustrating a configuration of each cellular phone 1 of FIG. 1. As illustrated in the figure, the cellular phone 1 includes a CPU (Central Processing Unit) 11, a ROM (Read Only Memory) 12, a RAM (Random Access Memory) 13, an input device 14, a display device 15, and a communications device 16. Though the cellular phone 1 includes other configuration components necessary for a telephone call, they do not relate to the present invention directly, so their explanation is omitted. A unique user ID (UID) is allocated to each cellular phone 1. In place of the user ID, a cellular phone number may be used.

The CPU 11 executes a program stored in the ROM 12 to execute processing that includes management of the member list to be described later and is necessary for exchanging mail with other cellular phones 1. The CPU 11 includes an internal timer that measures the current date and time. Time that is measured by the internal timer is used to create a group ID to be described later. The ROM 12 stores a processing program of the CPU 11 including an application program to be described later. At least part of the ROM 12 is formed by a flash memory that is electrically writable/erasable. The RAM 13 is battery backed-up and stores a member list to be described later and mail that was sent to other cellular phones 1 or received from other cellular phones 1.

The input device 14 includes numerical keys "1" to "0," a "*" key, a "#" key and the like, and inputs necessary information to the CPU 11 by the user's operation. The input device 14 is also used to input letters (alphabets and the like) to create mail. The display device 15 includes a liquid crystal display device and the like to display various information items such as mail that is being created, and mail that was received from other cellular phones 1. The communications device 16 receives and transmits information from/to other cellular phones 1 via the communications network 2.

FIG. 3 is a view illustrating an example of the member list managed in the cellular phone 1 of each member of the "Fellowship." A member list 3 is created for each "Fellowship." As illustrated in this figure, the member list 3 includes head data 30 and profile data 31 to 3n of each member. Profile data 31 to 3n of each member is connected to one another in order from the head data 30.

The header data 30 is data for identifying to which "Fellowship" the member list belongs, and the header data 30 also includes a group ID (GID). The group ID is formed by combining a user ID of a leader, who formed the corresponding "Fellowship," with time information (date and time, preferably including at least seconds) on which the corresponding "Fellowship" was formed the first time. Since the same user cannot physically form multiple "Fellowships" at exactly the same time, the group ID, which uniquely specifies the "Fellowship," can be generated without passing through the server apparatus.

Each of profile data 31 to 3n registers information on each member of the "Fellowship" shown by the header data 30 and includes at least a handle name of the corresponding member, a user ID, a receiver mail address and a character, which is associated with the corresponding member. The handle name, the user ID, and the address are sent by mail (to be specifically described) from the corresponding member. When a participation contact mail to be described later is sent from another member, profile data 31 to 3n are added to the member list 3 in order according to the reception of the participation contact mail.

Regarding the character, the user of the cellular phone 1 in which the member list 3 is registered selects a character, and the selected character is registered in each of the profile data 31 to 3n. The character can be selected according to a character selection screen that is automatically started by the application program when profile data is added to the member list 3 by the participation contact mail. When the character is not selected, a default character is automatically registered in the profile data 31 to 3n. The character registration can be changed arbitrarily by starting the character selection screen.

The member list 3 registered in the cellular phone 1 of each member does not include profile data of the corresponding user himself/herself. Regarding profile data of other members of the "Fellowship," the same data is included in the member list 3 registered in the cellular phone 1 of any member. However, when a new member joins in the "Fellowship" or a member withdraws from the "Fellowship," some time lag occurs until the contents of the member list 3 registered in the cellular phone 1 of each member are unified, in some cases. In the cellular phone 1 of a different member, the order in which profile data 31 to 3n is connected to the member list 3 differs in some cases.

Figure 4C:
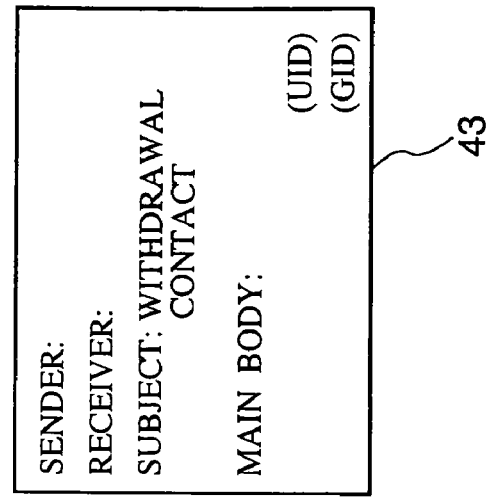
FIG. 4C is a view illustrating an example of mail exchanged among cellular phones to manage a member list when a member withdraws from a "Fellowship"
Figure 4B:
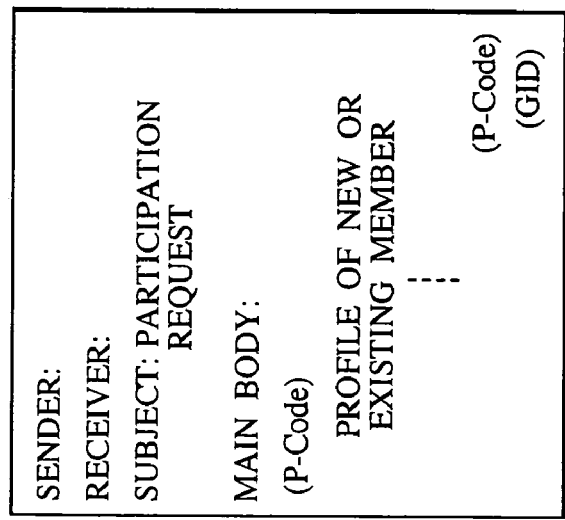
FIGS. 4A and 4B are views each illustrating an example of mail exchanged among cellular phones to manage a member list when a new member joins in a "Fellowship"
Figure 4A:
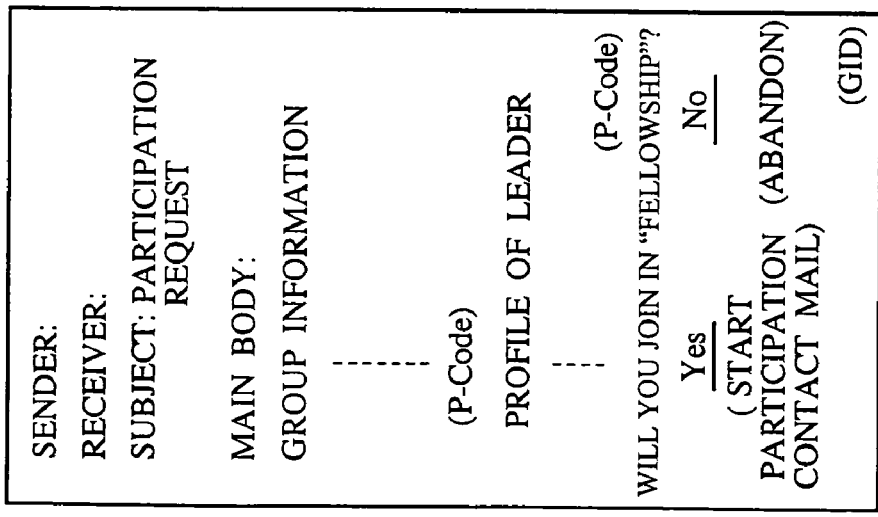

Each of FIGS. 4A and 4B illustrates an example of mail exchanged among the cellular phones 1 of the respective members (including a new member) when a new member joins in the "Fellowship," and FIG. 4C illustrates an example of mail exchanged among the cellular phones 1 of the respective members (including a withdrawing member) when a member withdraws from the "Fellowship." Each mail illustrated in FIGS. 4A to 4C is used to manage the member list 3 and has a format different from that of mail normally exchanged among the members of the "Fellowship." In FIGS. 4A to 4C, letters in the parenthesis indicate control information and are not shown on the display device 15 as the contents of mail. These mail formats are started by the application program.

FIG. 4A illustrates a participation invitation mail for which a leader invites a new member. A participation invitation mail 41 is created and transmitted when the leader forms a new "Fellowship" and invites an initial member to join in the "Fellowship" and when the leader invites an additional member to join in the already formed "Fellowship." When the leader forms the new "Fellowship," the format for the participation invitation mail 41 may be started by the application program, subsequent to generation of the member list 3. When the leader invites an additional member to join the already formed "Fellowship," the member to be invited may be designated based on the already created participation invitation mail 41.

The participation invitation mail 41 includes a sender address, a receiver address, a subject, and a main body, similar to the general mail. In the subject, a "participation request" is always described. The cellular phone 1 that received the participation invitation mail 41 identifies whether the mail is the participation invitation mail 41 by the subject "participation request." The sender address is a mail address of the leader of the "Fellowship." The receiver address is a mail address of the user, who is invited to join in the "Fellowship." The participation invitation mail 41 is sent to the user, who is invited to join the "Fellowship," from the leader of the "Fellowship."

The main body includes profile data of the leader next to the group information (the handle name and the user ID). The mail address of the leader is not included in the group information of the participation invitation mail 41, because it can be recognized by the sender address. Control information (P-code) is added before and after profile data. Next to the profile data, the main body also includes a question: whether the user joins in the "Fellowship," and responses to the question (Yes or No: each includes control information). The main body finally includes a group ID as control information.

The user of the cellular phone 1, who received the participation invitation mail 41, operates the input device 14 and selects the answer of "Yes" when he/she joins in the "Fellowship" or operates the input device 14 and selects the answer of "No" when he/she does not join. When "No" is selected, the participation invitation mail 41 is discarded from the cellular phone 1 by the operation of the application program based on control information included in the answer. When "Yes" is selected, a member list 3 is newly created by the application program based on control information included in the answer and a format for a participation contact mail 42 to be explained next is started.

FIG. 4B illustrates a participation contact mail for notifying the existing members of the participation of a new member in the "Fellowship" and notifying the new member of the existing members of the "Fellowship." The participation contact mail 42 includes a sender address, a receiver address, a subject, and a main body, similar to the general mail. In the subject, a "participation contact" is always described. The cellular phone 1 that received the participation contact mail 42 identifies whether the mail is the participation contact mail 42 by the subject "participation contact." Three cases are considered. Namely, a first case is that the participation contact mail 42 is sent to the leader from the member, who newly joined in the "Fellowship." A second case is that the participation mail 42 is sent to an existing member from the leader. A third case is that the participation contact mail 42 is sent to the newly joined member from an existing member. In each case, the sender address is a mail address of the newly joined member, a mail address of the leader, and a mail address of the existing member, respectively. Moreover, in each case, the receiver address is a mail address of the leader, a mail address of the existing member, and a mail address of the newly joined member, respectively.

The main body includes profile data (handle name, user ID, and mail address) of the newly joined member or the existing member (excluding the leader). Control information (P-Code) is added before and after profile data. When the participation contact mail 42 is transmitted to the leader from the newly joined member and when the participation mail 42 is transmitted to the existing member from the leader, the profile data shows data of the newly joined member. When the participation contact mail 42 is transmitted to the newly joined member from the existing member, the profile data shows data of the existing member. The main body finally includes a group ID as control information.

When the member, who newly joined in the "Fellowship," sends the participation contact mail 42 to the leader, he/she must input profile data according to the format to instruct transmission of the participation contact mail 42. When the newly joined member instructs transmission of the participation contact mail 42, the CPU 11 of the cellular phone 1 of the corresponding member forms header data 30 according to the participation invitation mail 41 received from the leader. It also connects profile data of the leader included in the participation invitation mail 41 as profile data 31 to the header data 30 to create a new member list 3 and stores the list to the RAM 13.

When the cellular phone 1 of the leader receives the participation contact mail 42 from the new member, the CPU 11 of the cellular phone 1 extracts profile data of the new member from the received participation contact mail 42 and adds the extracted data to the member list 3. The CPU 11 generates a participation contact mail 42 including profile data of the new member and transmits the generated mail to the cellular phones 1 of all existing members according to the member list 3.

When the cellular phone 1 of the existing member receives the participation contact mail 42 from the leader, the CPU 11 of the cellular phone 1 extracts profile data of the new member from the received participation contact mail 42 and adds the extracted data to the member list 3. The CPU 11 generates a participation contact mail 42 including its own profile data and transmits the generated mail to the cellular phone 1 of the newly joined member. When the cellular phone 1 of the newly joined member receives the participation contact mail 42 from the existing member, the CPU 11 of the cellular phone 1 extracts profile data of the existing member from the received participation contact mail 42 and adds the extracted data to the member list 3.

FIG. 4C illustrates a withdrawal contact mail for notifying that a certain member withdraws from the "Fellowship." A withdrawal contact mail 43 includes a sender address, a receiver address, a subject, and a main body, similar to the general mail. In the subject, a "withdrawal contact" is always described. The cellular phone 1 that received the withdrawal contact mail 43 identifies whether the mail is the withdrawal contact mail 43 by the subject "withdrawal contact."

The sender address is a mail address of the member, who will withdraw from the "Fellowship." The receiver address is a mail address of all members registered in the member list 3. The withdrawal contact mail 43 is transmitted to the cellular phones 1 of all other members from the cellular phone 1 of the member, who will withdraw, according to the member list 3. The main body includes a user ID and a group ID of the member, who will withdraw.

The withdrawal contact mail 43 is transmitted to the cellular phone 1 of another member when the member, who will withdraw from the "Fellowship," instructs transmission using the application program. The CPU 11 of the cellular phone 1 (namely, the cellular phone 1 of the member, who will withdraw) that transmitted the withdrawal contact mail 43 deletes the member list of the corresponding "Fellowship." The CPU 11 of the cellular phone 1 (namely, the cellular phone 1 of another member) deletes profile data 31 to 3n of the withdrawn member from the member list 3 according to the user ID and the group ID included in the received withdrawal contact mail 43.

Mail of various kinds, which is different from the mails 41 to 43 for managing the member list 3, is exchanged among the members of the "Fellowship." When mail is transmitted after designating a "Fellowship," the mail is transmitted to all members of the "Fellowship" registered in the member list 3. The cellular phone 1, which received the mail transmitted after designating the "Fellowship," displays a character registered in the profile data 31 to 3n of the member who transmitted the corresponding mail.

Figure 5A:
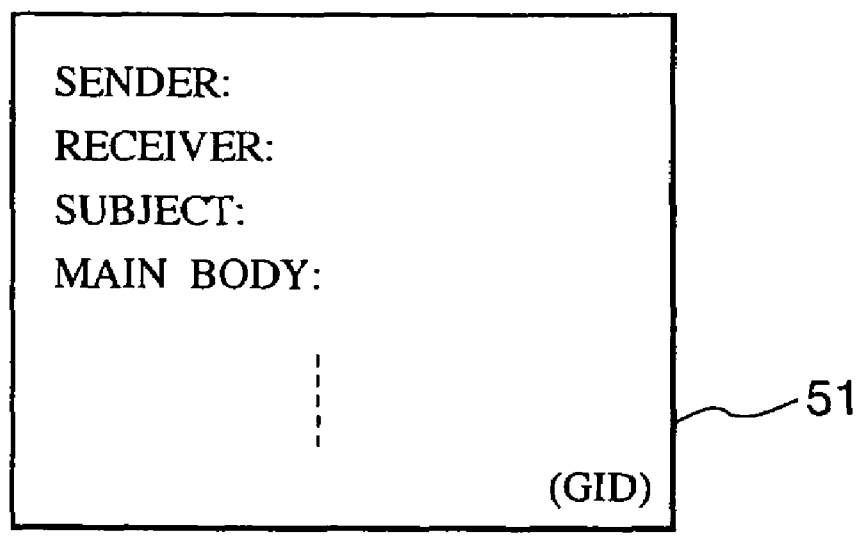
FIG. 5A is a view illustrating an example of mail exchanged among the members of a "Fellowship"

FIG. 5A illustrates a mail transmitted after designating a "Fellowship" (hereinafter referred to as fellowship mail). A fellowship mail 51 includes a sender address, a receiver address, a subject, and a main body, similar to the general mail. Though the subject and the contents of the main body are free, a group ID of the corresponding "Fellowship" as control information is added to the end of the main body. The cellular phone 1 that received the fellowship mail 51 confirms whether the mail is the fellowship mail 51 based on the group ID. The receiver address is a mail address of all members of the "Fellowship" registered in the member list 3.

Figure 5B:
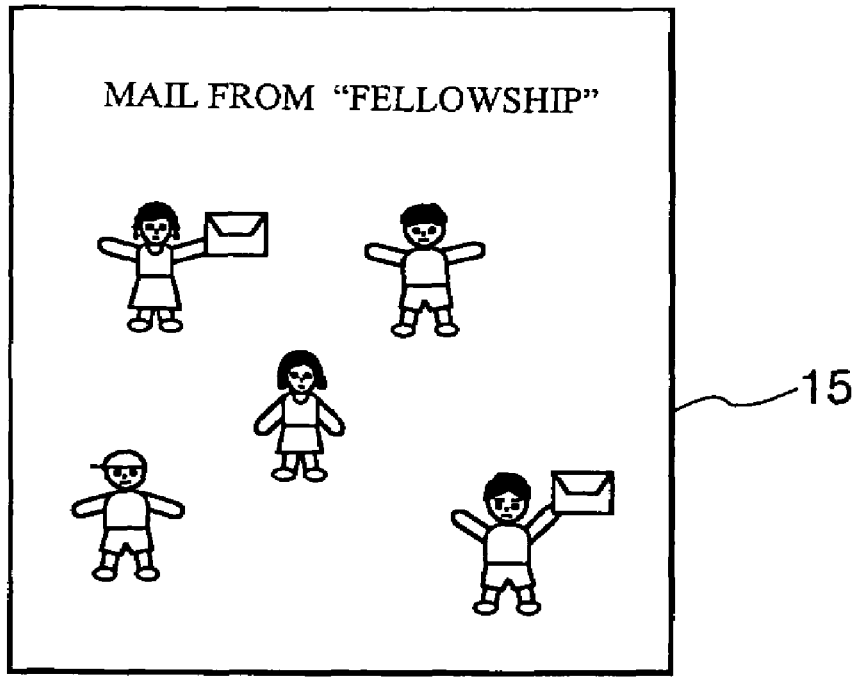
FIG. 5B is a view illustrating a display screen when a cellular phone of a member of a "Fellowship" receives mail from another member.

FIG. 5B is a view illustrating a screen displayed on the display device 15 of the cellar phone 1 that received the fellowship mail 51 from another member of the "Fellowship." Though each character corresponding to each member is displayed on the display screen according to the member list 3, the characters corresponding to the members, who transmitted the fellowship mail 51, are displayed in such a manner that the characters have mail in their hands.

The following will explain operations of the mail exchange system according to this embodiment. It is assumed that the users of multiple cellular phones form the "Fellowship" in order to exchange the fellowship mail 51, and that a new member joins the "Fellowship" or a member withdraws therefrom. An explanation will be given of processing that is necessary for uniformly managing the member list 3 showing the "Fellowship" in the cellular phone 1 of each member. An explanation will be given assuming that several users have already joined the "Fellowship."

Figure 6:
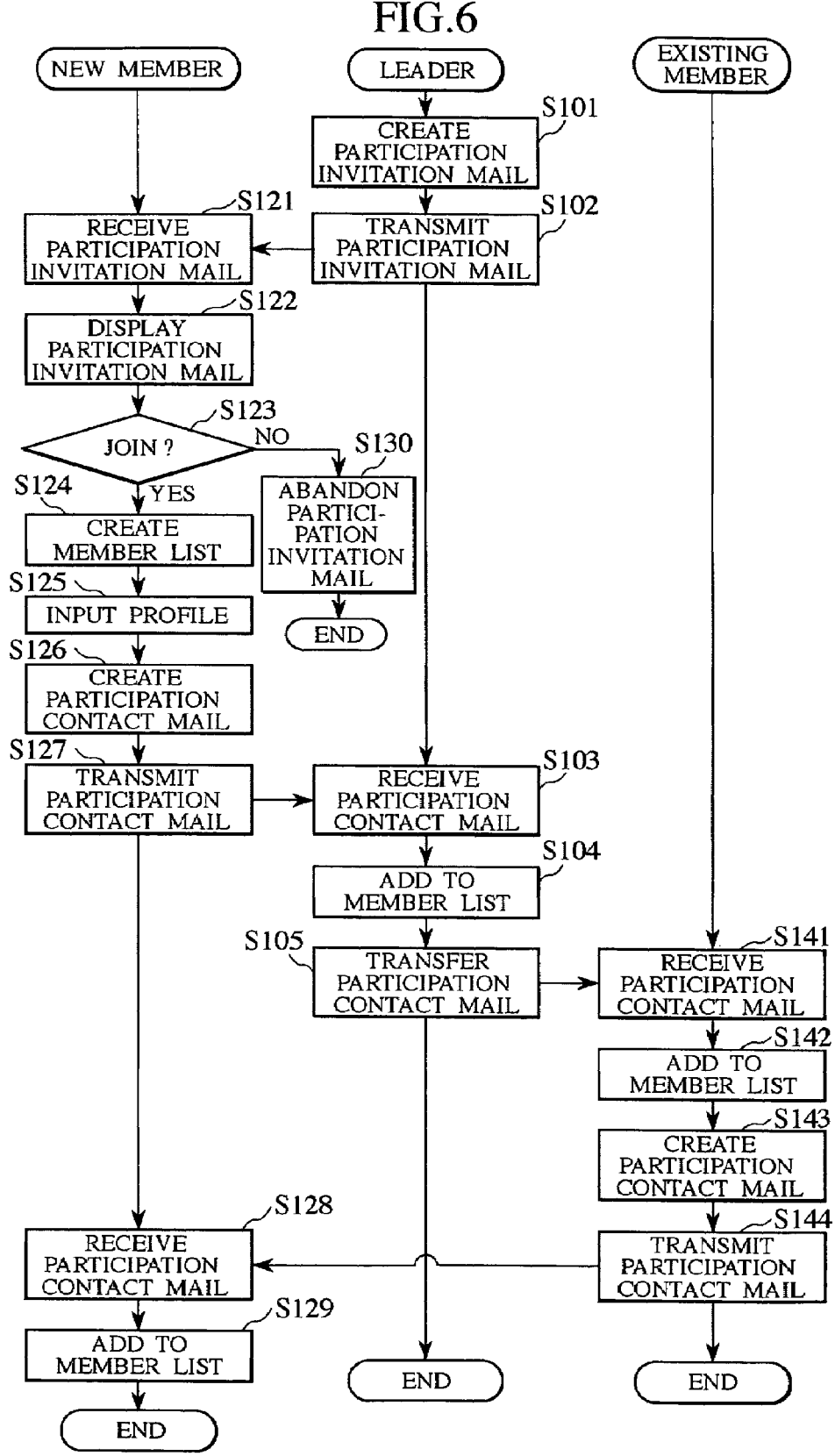
FIG. 6 is a flowchart illustrating processing executed by each cellular phone when a new member joins in a "Fellowship"

FIG. 6 is a flowchart illustrating processing executed by each cellular phone 1 when a new member joins in the "Fellowship." In the cellular phone 1 of the leader, the leader operates the input device 14 to designate a mail address as a receiver address of a user to be invited as a new member, and inputs necessary information to generate a participation invitation mail 41 (step S101). At the time of generating the participation invitation mail 41, an existing participation invitation mail 41 may be used. The CPU 11 causes the communications device 16 to transmit the generated participation invitation mail 41 via the communications network 2 (step S102).

In the cellular phone 1 of the user, who was invited as a new member, when the communications device 16 receives the participation invitation mail 41 (step S121), the CPU 11 causes the display device 15 to display the participation invitation mail 41 (step S122). The user, who was invited as the new member, operates the input device 14 to select either "Yes" or "No" from the alternatives displayed on the participation invitation mail 41. The CPU 11 determines whether "Yes" indicating the participation in the corresponding "Fellowship" is selected (step S123).

When "Yes" is selected as the alternative, the CPU 11 extracts a group ID from the participation invitation mail 41 to generate header data 30 of the member list 3, and extracts profile data of the leader from the participation invitation mail 41 to be connected to the header data 30 as first profile data 31 (step S124). The CPU 11 starts a format of the participation contact mail 42 and the new member inputs his/her profile data from the input device 14 according to the format (step S125).

When the profile data is input, the CPU 11 generates a participation contact mail 42 using the mail address of the leader, which is included in the participation invitation mail 41, as a sender address (step S126). Moreover, when transmission of the participation contact mail 42 is instructed from the input device 14 by the new member, the CPU 11 causes the communications device 16 to transmit the participation contact mail 42 via the communications network 2 (step S127).

In the cellular phone 1 of the leader, when the communications device 16 receives the participation contact mail 42 from the new member (step S103), the CPU 11 extracts profile data of the new member therefrom and adds the extracted profile data to the member list 3 (step S104). The CPU 11 causes the communications device 16 to transfer the mail to each existing member according to the mail addresses registered in the member list 3 (step S105). The processing in the cellular phone 1 of the leader ends.

In the cellular phone 1 of each existing member, when the communications device 16 receives the participation contact mail 42 transferred from the cellular phone 1 of the leader (step S141), the CPU 11 extracts profile data of a new member therefrom and adds the extracted profile data to the member list 3 (step S142). The CPU 11 generates a participation contact mail 42 including profile data of the existing member (step S143).

The CPU 11 designates the mail address of the new member as a receiver address and causes the communications device 16 to transmit the mail via the communications 2 (step S144). The processing in the cellular phone 1 of the existing member ends.

In the cellular phone 1 of the new member, when the communications device 16 receives the participation contact mail 42 from each existing member (step S128), the CPU 11 extracts profile data of the existing member from the participation contact mail 42 and adds the extracted profile data to the member list 3 (step S129). When the reception of the participation contact mail 42 from all existing members is finished, the member list 3, which is substantially the same as that of the cellular phone 1 of the existing member, is generated in the cellular phone 1 of the new member, and the processing in the cellular phone 1 of the new member ends.

In the cellular phone 1 that received the participation invitation mail 41, when "No" is selected, the CPU 11 abandons the invitation mail 41 (step S130) and finishes the processing. Then, in the cellular phones 1 of the leader and the existing members, no processing is performed thereafter.

In the aforementioned processing, the CPU 11 (relating to all cellular phones 1 of the leader, the existing members, and the new member) starts the selection screen of the character by the application program at the time of adding profile data to the member list 3. When the character is selected in accordance with the selection screen, the character is also registered in the added profile data. When the character is not selected by the member, the default character is registered in the profile data. The character registration may be changed afterward.

Figure 7:
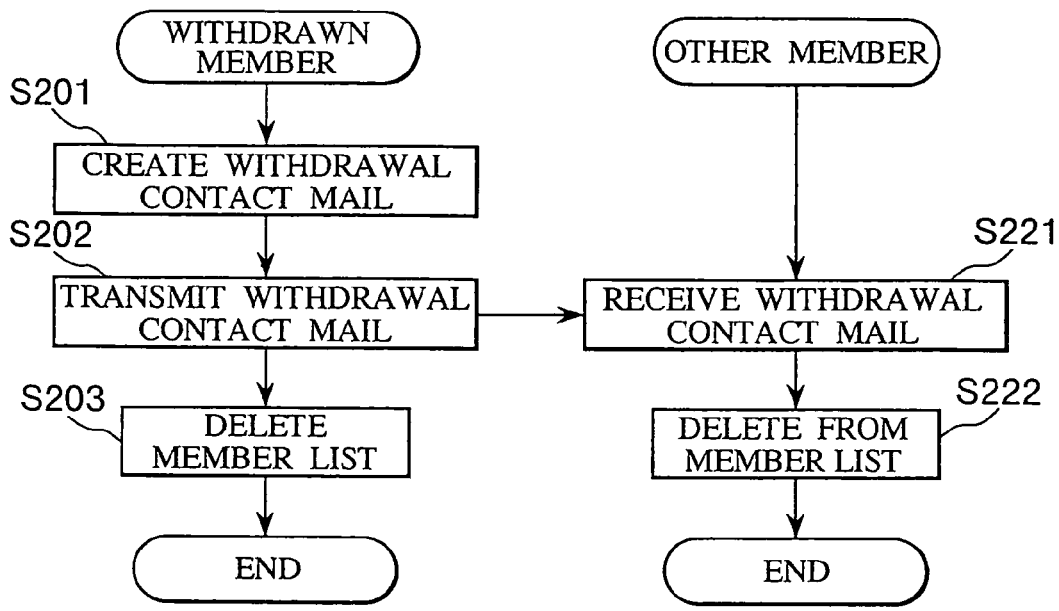
FIG. 7 is a flowchart illustrating processing executed by each cellular phone when a member withdraws from a "Fellowship"

FIG. 7 is a flowchart illustrating processing executed by each cellular phone 1 when a member withdraws from the "Fellowship." In the cellular phone 1 of the member, who will withdraw, when the member operates the input device 14 to instruct the transmission of a withdrawal contact mail 43, the CPU 11 generates a withdrawal contact mail 43 using mail addresses of all other members registered in the member list 3 as receiver addresses (step S201). The CPU 11 causes the communications device 16 to transmit the generated withdrawal contact mail 43 via the communications network 2 (step S202). The CPU 11 deletes the entire member list 3 of the corresponding "Fellowship" (step S203) and finishes processing.

In the cellular phone 1 of the other member, when the communications device 16 receives the withdrawal contact mail 43 from the withdrawn member (step S221), the CPU 11 specifies profile data of the withdrawn member by the user ID and the group ID included in the withdrawal contact mail 43 and deletes the profile data of the withdrawn member from the member list 3 (step S222). Then, the processing in the cellular phone 1 of the other member ends.

When the user as a leader intends to form a new "Fellowship," the user inputs instructions to form the new "Fellowship" from the input device 14 according to the application program in his/her cellular phone 1. Then, the CPU 11 obtains the current date and time from the internal timer and combines the obtained result with the user ID to generate a group ID. The CPU 11 generates header data 30 of the member list 3 of the "Fellowship" to be newly formed by the group ID. After that, though it is possible to invite participation in the "Fellowship," the participation contact mail 42 sent from the member, who joined first, is not transferred from the cellular phone 1 of the leader.

The participation contact mail 42 sent from the members, who joined second and afterward, is transferred to the cellular phone 1 of the other members according to the member list 3.

The fellowship mail 51 is exchanged among the members belonging to the "Fellowship." Processing, which is different from the mail exchange among users who do not belong to the "Fellowship," is executed during the exchange of the "Fellowship" mail 51.

Figure 8:
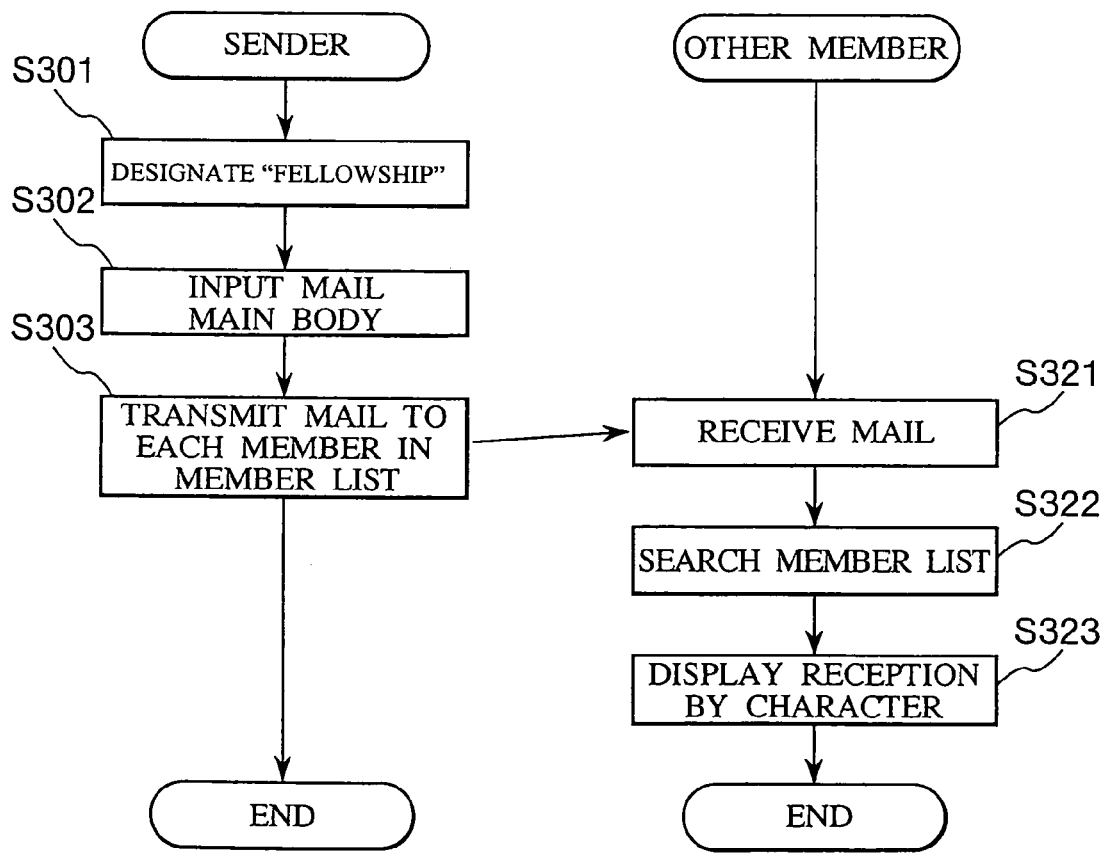
FIG. 8 is a flowchart illustrating processing executed by each cellular phone when mail is exchanged among members of a "Fellowship."

FIG. 8 is a flowchart illustrating processing executed by each cellular phone 1 when the fellowship mail 51 is exchanged. In the cellular phone 1 of the member, who intends to transmit mail to another member of the "Fellowship," the member operates the input device 14 by the application program to designate a "Fellowship" that transmits mail (step S301).

The format of the fellowship mail 51 to which the group ID and the user ID are added is started by the application program, and the member inputs the main body from the input device 14 (step S302). When the member instructs the transmission of the fellowship mail 51, the CPU 11 causes the communications device 16 to transmit the corresponding fellowship mail 51 to all other members according to the mail addresses registered in the member list 3 of the designated "Fellowship" via the communication network 2 (step S303). Processing on the transmitting side ends.

In the cellular phone 1 of another member, when the communications device 16 receives the fellowship mail 51 that was transmitted in step S303 (step S321), the CPU 11 extracts the group ID and the user ID included in the main body. The CPU 11 searches the member list 3 (member lists 3 of all "Fellowships" when the member joins in the multiple "Fellowships") according to the extracted group ID and the user ID, and specifies the "Fellowship" and the member of the fellowship mail 51 (step S322).

The CPU 11 causes the display device 15 to display the character corresponding to the member of the "Fellowship" specified as a result of the search and display that the character corresponding to the specified member has mail in its hand (step S323). A glance at this display screen shows the "Fellowship" and the member of the fellowship mail 51. For example, when the user operates the input device 14 to designate the character by the application program, the fellowship mail 51 is displayed on the display device 15.

As explained above, according to the mail exchange system of this embodiment, in the cellular phone 1 of the member, who newly joined in the "Fellowship" by the invitation from the leader, the member list 3, which includes the group ID of the corresponding "Fellowship" and profile data of the leader, is created according to the participation invitation mail 41 from the leader. In the cellar phone 1 of the corresponding member, the participation contact mail 42 including his/her profile data is generated and transmitted to the cellular phone 1 of the leader. In the cellular phone 1 of the leader, profile data of the corresponding new member is added to the member list 3 according to the participation contact mail 42 received from the cellular phone 1 of the new member. The participation contact mail 42 received from the cellular phone 1 of the new member is transferred to the cellular phone 1 of each existing member registered in the member list 3. In the cellular phone 1 of each existing member, profile data of the new member is added to the member list 3 by the participation contact mail 42 received from the leader. The participation contact mail 42 including his/her profile data is created and transmitted to the cellular phone 1 of the corresponding new member. In the cellular phone 1 of the new member, profile data of each existing member is added to the member list 3 by the participation contact mail 42 received from the cellular phone 1 of each existing member.

Profile data of the new member is added to the member list 3 stored in the RAM 13 of the cellular phone 1 of each of the leader and the existing members through the series of processes, so that the contents thereof are substantially unified. Profile data of all the existing members including the leader are also added to the member list 3 of the new member, so that the contents thereof are substantially unified.

In the cellular phone 1 of the member, who will withdraw from the "Fellowship," the withdrawal contact mail 43 is generated and transmitted to the cellular phone 1 of each of the other members. The member list 3 stored in the RAM 13 is also deleted, so that withdrawal from the "Fellowship" is completed. In the cellular phone 1 of the other members that received the withdrawal contact mail 43, profile data of the withdrawn member is deleted from the member list 3 according to the withdrawal contact mail 43. Accordingly, the contents of the member lists 3 of all members left in the "Fellowship" are unified with the profile data of the withdrawn member deleted.

By exchanging the participation invitation mail 41, the participation contact mail 42, and the withdrawal contact mail 43 as mentioned above, the member list 3 stored in the RAM 13 of the cellular phone 1 of each member is unified without passing through the server apparatus. The member list 3 is stored in the cellular phone 1 of each member, thereby eliminating the need for a server exchanging the fellowship mail 51 among the members of the "Fellowship" on the communications network 2. Generation and update of the member list 3 are automatically executed according to the participation invitation mail 41, the participation contact mail 42 and the withdrawal contact mail 43. As a result, each of the members of the "Fellowship" does not have to monitor the participation of the new member and the withdrawal of the member precisely and each member can transmit mail to the other members of the "Fellowship" without any omissions.

The group ID and the user ID as control information are added to the fellowship mail 51 exchanged among the members of the "Fellowship." In the cellular phone 1 that received the fellowship mail 51 from another member, the display device 15 displays the character corresponding to the sender who has mail in his hand based upon the group ID and the user ID. Thus, the user can easily recognize who sent the fellowship mail 51 and to which "Fellowship" the sender belongs.

The group ID, which is added to the fellowship mail 51, the participation invitation mail 41, the participation contact mail 42 and the withdrawal contact mail 43, are formed by combining the user ID of the leader with time information that forms the "Fellowship." Since the same user cannot physically form multiple "Fellowships" at exactly the same time, the group ID is uniquely fixed for each "Fellowship." For this reason, the group ID that can uniquely specify the "Fellowship" can be generated without passing through the server.

The present invention is not limited to the aforementioned embodiment, and various modifications and applications may be possible. The following will explain some modifications that can be applied to the present invention.

In the aforementioned embodiment, the withdrawal contact mail 43 was transmitted to all other members according to the member list 3 stored in the cellular phone 1 of the corresponding member when the member intended to withdraw from the "Fellowship." However, the withdrawal contact mail 43 may be first transmitted to the cellular phone 1 of the leader and then transferred to the cellular phone 1 of each of the other members from the cellular phone 1 of the leader, similar to the participation contact mail 42.

In the aforementioned embodiment, after forming the "Fellowship," the fellowship mail 51 to which the group ID was added was exchanged among all members. Actually, there is a member who does not need to receive the mail, even if he/she is a member of the "Fellowship," depending on the contents of the mail. For example, a member, who rejected an invitation of a certain event, does not need any mail relating to the event afterward.

For instance, regarding the event invitation mail, the answer of "Yes" or "No" that includes control information is inserted to the mail body to input either answer, so that a return mail may be created by the application program in the cellular phone 1 that received the corresponding mail. When the cellular phone 1, which transmitted the invitation mail, receives mail as "Re: subject of invitation mail," the subject of the return mail here can be identified as a return mail of a reply to the invitation.

When the member, who transmitted the first invitation mail, transmits a continuous mail (information of more detailed contents) to the member of the "Fellowship" subsequent to the first invitation mail, this mail may be designated as a continuous mail by the application program. In this case, the address of the member, who responds "No" by the return mail, can be deleted from the receiver address of the continuous mail.

This eliminates the unnecessary mail from being transmitted from another member even if the mail is transmitted from the member of the "Fellowship," thereby preventing each member from being annoyed with the unnecessary mail. When the reception of the corresponding return mail is displayed by the character, the cellular phone 1, which received the return mail to the invitation mail, can display what contents of the reply are sent by the return mail.

The aforementioned embodiment explained the case in which the participation of the new member in the "Fellow" was carried out according to the invitation mail 41 sent from the leader. However, the new member may participate in the "Fellowship" so that invitation information to the "Fellowship" is described on a bulletin board and the invitation contact mail 42 is sent to the cellular phone 1 of the leader from the cellular phone 1 of the new member based on this invitation information. The cellular phone of the new member may create a new member list 3 including only the header data 30 based on this invitation information After receiving the participation contact mail 42 from the cellular phone 1 of the new member, the cellular phone 1 of the leader 1 can send back the participation contact mail 42 including the profile data to the cellular phone 1 of the new member 1. The cellular phone 1 of the new member may extract profile data of the leader from the received participation contact mail 42 and may add the extracted data to the member list 3.

The aforementioned embodiment explained the case in which the cellular phones 1 were applied as the terminal devices for exchanging the fellowship mail 51 among the members of the "Fellowship." However, terminal devices of the other types such as a personal computer, PDA (Personal Digital Assistance) and the like can be applied as the terminal devices for exchanging the fellowship mail 51 if they can transmit and receive mail via the communications network. Terminal devices of different types may be mixed as the terminal devices for exchanging the fellowship mail 51.

The aforementioned explanation was based on the assumption that the application program, which was executed by the cellular phone 1 of the user as the member (including the leader, existing members, and new member) of the "Fellowship," was already stored in the ROM 12. However, the application may be stored in a fixed disk device that is provided in a server apparatus existing on the communications network 2. The server apparatus converts data of the application program stored in the fixed disk device to be superimposed on a carrier wave according to the request from the cellular phone 1 to distribute the application program to the cellular phone 1 via the communications network 2. The application program distributed from the server apparatus is stored in the RAM 13 or ROM 12 (formed by a flash memory) and the stored application program can be executed by the CPU 11.

When the cellular phone 1 is connected to the personal computer 1 and the like, so that the application program can be written onto the RAM 13 or ROM 12 from the personal computer, the application program can be provided in such a form that the application program is stored in a recording medium such as CD-ROM or DVD-ROM that is readable by the personal computer. When devices other than the cellular phone 1 are used as the terminal devices for exchanging mail, the application program can be provided in such a form that the application program is stored in a recording medium that is readable by the corresponding terminal device.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

What is claimed is:

1. A mail exchange system, comprising:
a plurality of terminal devices connected to one another via a communications network, each terminal device having a member information storage that stores member information of members who belong to a group that exchange mail via said communications network, said plurality of terminal devices comprising a specific member terminal, an existing member terminal, and a newly joining member terminal;

said specific member terminal including:
a participation mail receiver that receives participation mail, including member information of a member who newly joins the group, from said newly joining member terminal via said communications network;
a first member information adder that extracts the member information included in the participation mail received by said participation mail receiver and stores the extracted member information in said member information storage; and
a new member information mail transmitter that transmits a new member mail, including the member information of the newly joining member, to said existing member terminal according to information stored in said member information storage via said communications network, said existing member terminal including:
a new member information mail receiver that receives the new member mail;
a second member information adder that extracts the member information included in the received new member mail and stores the extracted member information in a member list in said member information storage; and
a self-information mail transmitter that transmits an existing member mail, including self-member information, to said newly joining member terminal via said communications network, and said newly joining member terminal including:
- a new participation mail transmitter that transmits the new member mail, including self-member information of the newly joining member, to said specific member terminal via said communications network;
- an existing member information mail receiver that receives existing member mail from a plurality of said existing member terminals; and
- a member information generator that generates entries in said member list stored in said member information storage by extracting the self-member information from the received existing member mail from said plurality of existing member terminals, other than said specific member terminal, wherein a group ID, indicating the group exchanging the mail, is added to the mail to be exchanged among said terminal devices of the members belonging to the group, the group ID including user identification information of said terminal device of a member who forms the group and including a time when the group is formed, and wherein the group ID is a unique identifier for each group, is generated at said terminal device of the member who forms the group, and is generated exclusively by said terminal device.

2. The mail exchange system according to claim 1, wherein each of said terminal devices further comprises:
- a withdrawal mail transmitter that transmits withdrawal mail, including information of withdrawal from the group, to said terminal devices of all members in said member list stored in said member information storage;
- a withdrawal mail receiver that receives the withdrawal mail, including the information of a withdrawing member, transmitted from said withdrawal mail transmitter of said terminal device of the withdrawing member; and
- a member information deleter that deletes the member information of the withdrawing member from said member list in said mail member information storage.

3. The mail exchange system according to claim 1, wherein said specific member terminal further includes an invitation mail transmitter that transmits invite mail, including information for inviting participation in the group and self-member information, to said newly joining member terminal via said communications network;
- wherein said newly joining member terminal further includes an invitation mail receiver that receives the invite mail; and
- wherein said member information generator further generates said member list in said member information storage based on the received invite mail.

4. The mail exchange system according to claim 1, wherein said specific member terminal further includes a second self-information mail transmitter that transmits specific member mail, including self-member information, to said newly joining member terminal in response to the participation mail received by said participation mail receiver;
- wherein said newly joining member terminal further includes a specific member information mail receiver that receives the specific member mail, including the self-member information of the specific member; and
- wherein said member information generator generates said member list stored in said member information storage based on the specific member mail received by said specific member information mail receiver.

5. The mail exchange system according to claim 1, wherein said member list in said member information storage stores member information of members, who belong to the group.

6. The mail exchange system according to claim 5, wherein said user identification information that uniquely specifies each user is allocated to each of said terminal devices.

7. The mail exchange system according to claim 1, wherein each of said terminal devices includes a cellular phone.

8. The mail exchange system according to claim 1, wherein the group ID consists essentially of the user identification information of the terminal device of the member who forms the group and at least one of the time when the group is formed and a date when the group is formed.

9. A mail exchange terminal device for exchanging mail with other mail exchange terminal devices via a communications network, comprising:
- a member information storage that stores member information of a member, who belongs to a group exchanging mail;
- a mail receiver that receives new member mail, including member information of a member who newly joins the group, from another mail exchange terminal device via said communications network;
- a member information adder that extracts the member information included in the received new member mail and stores the extracted member information in a member list stored in said member information storage; and
- a mail transmitter that transmits contact mail, including self-member information to said mail exchange terminal device of the newly joining member via said communications network, whereby said mail exchange terminal device of the newly joining member generates entries in said member list by extracting the self-member information from contact mail received from a plurality of mail exchange terminal devices of existing members, the existing members being other than a specific member that sent an invite mail to said mail exchange terminal device of the newly joining member, wherein a group ID, indicating the group exchanging the mail, is added to the mail to be exchanged among said terminal devices of the members belonging to the group, the group ID including user identification information of said terminal device of a member who forms the group and including a time when the group is formed, and wherein the group ID is a unique identifier for each group, is generated at said terminal device of the member who forms the group, and is generated exclusively by said terminal device.

10. The mail exchange terminal device according to claim 9, wherein the group ID consists essentially of the user identification information of the terminal device of the member who forms the group and at least one of the time when the group is formed and a date when the group is formed.

11. The mail exchange terminal device according to claim 9, wherein the received new member mail is transmitted from said mail exchange terminal device of the specific member, who belongs to the group, to said terminal device of each other member, who belongs to the group, according to said member list stored in said member information storage.

12. A mail exchange terminal device for exchanging mail with other mail exchange terminal devices via a communications network, comprising:
- a member information storage that stores member information of a member, who belongs to a group for exchanging mail;
- a mail receiver that receives participation mail, including member information of a member, who newly joins in the group, from a mail exchange terminal device of the newly joining member via said communications network;

a member information adder that extracts the member information included in the received mail and stores the extracted member information in a member list stored in said member information storage; and a mail transmitter that transmits new member mail including the member information of the newly joining member to terminal devices of other existing members according to said member list stored in said member information storage via said communications network, wherein the other existing members transmit contact mail, including member information, to said mail exchange terminal device of the newly joining member so that the newly joining member generates an entry in said member list by extracting the member information from the contact mail of the other existing members, other than a specific member that sent an invite mail to said mail exchange terminal device of the newly joining member, wherein a group ID, indicating the group exchanging the mail, is added to the mail to be exchanged among said terminal devices of the members belonging to the group, the group ID including user identification information of said terminal device of a member who forms the group and including a time when the group is formed, and wherein the group ID is a unique identifier for each group, is generated at said terminal device of the member who forms the group, and is generated exclusively by said terminal device.

13. A mail exchange terminal device for exchanging mail with other mail exchange terminal devices via a communications network, comprising:

an invitation mail receiver that receives invite mail for inviting participation in a group for exchanging mail that is already formed by a user of a specific mail exchange terminal device via said communications network;

a mail transmitter that transmits participation mail, including self-member information of a newly joining member, to said specific mail exchange terminal device via said communications network at the time of joining the group in response to participation invited by the received invite mail;

an existing member information mail receiver that receives contact mail including member information of other existing members, which is transmitted from mail exchange terminal devices of other existing members via said communications network in response to the participation mail transmitted to said mail exchange terminal device of the specific member; and a member information generator that generates in a member information storage a member list that stores member information of a member, who belongs to the group, based on the received invite mail and the received contact mail, wherein an entry in said member list is generated from member information extracted from the received contact mail, the received contact mail being received from said mail exchange terminal devices of the other existing members, wherein a group ID, indicating the group exchanging the mail, is added to the mail to be exchanged among said terminal devices of the members belonging to the group, the group ID including user identification information of said terminal device of a member who forms the group and including a time when the group is formed, and wherein the group ID is a unique identifier for each group, is generated at said terminal device of the member who forms the group, and is generated exclusively by said terminal device.

14. A mail exchange terminal device for exchanging mail with other mail exchange terminal devices via a communications network, comprising:

a member information storage that stores member information of a member, who belongs to a group for exchanging mail;

a mail transmitter that transmits mail to a mail exchange terminal device of another member, who belongs to the group, via said communications network according to the member information stored in said member information storage;

a withdrawal mail transmitter that transmits withdrawal mail, including information of withdrawal from the group, to mail exchange terminal devices of all other members listed in the stored member information via said communications network;

a withdrawal mail receiver that receives withdrawal mail, including information, which indicates that another member is withdrawing from the group, from another mail exchange terminal device via said communications network; and a member information deleter that deletes member information of all members from said member information storage belonging to the group in response to the withdrawal mail transmitter transmitting the withdrawal mail, wherein the member information deleter is configured to delete a member information in the member information storage corresponding to the withdrawing member based on the received withdrawal mail, wherein a group ID, indicating the group exchanging the mail, is added to the mail to be exchanged among said terminal devices of the members belonging to the group, the group ID including user identification information of said terminal device of a member who forms the group and including a time when the group is formed, and wherein the group ID is a unique identifier for each group, is generated at said terminal device of the member who forms the group, and is generated exclusively by said terminal device.

15. A mail exchange terminal device for exchanging mail with other mail exchange terminal devices via a communications network, comprising a memory that stores a program and data, a processor that executes said program, and a communications device that communicates with other mail exchange terminal devices, wherein said program stored in memory causes said processor to execute:

storing member information of existing members, who belong to a group for exchanging mail, in the memory;

causing the communications device to receive a contact mail, including member information of a member who newly joins the group, from another mail exchange terminal device via the communications network;

extracting the member information included in the received contact mail and storing the extracted member information in the memory; and causing the communications device to transmit invite mail including self-member information to the mail exchange terminal device of the newly joining member via the communications network, whereby the mail exchange terminal device of the newly joining member generates entries in a member list by extracting the self-member information from the invite mail received from the communications device, the invite mail being received from existing members other than a specific member that sent an invite mail to the mail exchange terminal device of the newly joining member, wherein a group ID, indicating the group exchanging the mail, is added to the mail to be exchanged among the terminal devices of the members belonging to the group, the group ID including user identification information of the terminal device of a member who forms the group and including a time when the group is formed, and wherein the group ID is a unique identifier for each group, is generated at the terminal device of the member who forms the group, and is generated exclusively by the terminal device.

16. A mail exchange terminal device for exchanging mail with other mail exchange terminal devices via a communications network, comprising a memory that stores a program and data, a processor that executes said program, and a communications device that communicates with other mail exchange terminal devices, wherein said program stored in memory causes said processor to execute:

storing member information of existing members, who belong to a group for exchanging mail, in the memory;

causing the communications device to receive a contact mail, including member information of a member who newly joins the group, from a mail exchange terminal device of a newly joining member via the communications network;

extracting the member information included in the received contact mail and storing the extracted member information in the memory; and causing the communications device to transmit new member mail, including the member information of the newly joining member, to a plurality of mail exchange terminal devices of the existing members via the communications network, whereby the mail exchange terminal device of the newly joining member generates entries in a member list by extracting member information from contact mail received from the plurality of mail exchange terminal devices of the existing members, the existing members being other than a member that sent an invite mail to the newly joining member, wherein a group ID, indicating the group exchanging the mail, is added to the mail to be exchanged among the terminal devices of the members belonging to the group, the group ID including user identification information of the terminal device of a member who forms the group and including a time when the group is formed, and wherein the group ID is a unique identifier for each group, is generated at the terminal device of the member who forms the group, and is generated exclusively by the terminal device.

17. A mail exchange terminal device for exchanging mail with other mail exchange terminal devices via a communications network, comprising a memory that stores a program and data, a processor that executes said program, and a communications device that communicates with other mail exchange terminal devices, wherein said program stored in memory causes said processor to execute:

causing the communications device to receive an invitation mail inviting participation in a group, which is already formed by users of other mail exchange terminal devices, from a mail exchange terminal device of a specific member via the communications network;

causing the communications device to transmit participation mail, including self-member information of a newly joining member, to the mail exchange terminal device of the specific member via the communications network at the time of joining the group where participation was invited by the received invitation mail;

causing the communications device to receive contact mail, which is transmitted from the mail exchange terminal devices of other existing members via the communications network in response to the mail transmitted to the mail exchange terminal device of the specific member, and includes member information of an existing member; and storing member information of members, who belong to the group, in the memory based on the received invitation mail and the received contact mail, by extracting member information from the received contact mail and generating an entry in a memory list for a member corresponding to the extracted member information, the received contact mail being received from the mail exchange terminal devices of the other existing members, other than the mail exchange terminal device of the specific member, wherein a group ID, indicating the group exchanging the mail, is added to the mail to be exchanged among the terminal devices of the members belonging to the group, the group ID including user identification information of the terminal device of a member who forms the group and including a time when the group is formed, and wherein the group ID is a unique identifier for each group, is generated at the terminal device of the member who forms the group, and is generated exclusively by the terminal device.

18. A mail exchange terminal device for exchanging mail with other mail exchange terminal devices via a communications network, comprising a memory that stores a program and data, a processor that executes said program, and a communications device that communicates with other mail exchange terminal devices, wherein said program stored in memory causes said processor to execute:

storing member information of existing members, who belong to a group where mail is exchanged, in the memory;

transmitting mail to mail exchange terminal devices of other members who belong to the group, via the communications network according to the stored member information;

causing the communications device to transmit a withdrawal mail, including information of withdrawal from the group, to the mail exchange terminal devices of all other members according to the stored member information via the communications network;

causing the communications device to receive the withdrawal mail, including information, indicating that another member is withdrawing from the group, from another mail exchange terminal device via the communications network; and deleting member information of all members from the member information storage belonging to the group in response to the communications device transmitting the withdrawal mail, and deleting member information of the another member from the memory in response to the communications device receiving the withdrawal mail indicating that another member is withdrawing from the group, wherein a group ID, indicating the group exchanging the mail, is added to the mail to be exchanged among the terminal devices of the members belonging to the group, the group ID including user identification information of the terminal device of a member who forms the group and including a time when the group is formed, and wherein the group ID is a unique identifier for each group, is generated at the terminal device of the member who forms the group, and is generated exclusively by the terminal device.

19. A method for exchanging mail among terminal devices connected to one another via a communications network, each terminal device having a member information storage that stores member information of members who belong to a group for exchanging mail, comprising:

transmitting participation mail, including member information of a member who newly joins the group, to a terminal device of a specific member from the terminal device of the newly joining member via the communications network;

receiving the participation mail at the terminal device of the specific member;

extracting the member information of the newly joining member from the received participation mail at the terminal device of the specific member and storing the extracted member information in the storage;

transmitting new member mail, including the member information of the newly joining member, to terminal devices of other existing members from the terminal device of the specific member via the communications network according to the member information stored in the storage of the terminal device of the specific member;

receiving the new member mail at the terminal devices of the other existing members;

extracting the member information of the newly joining member from the new member mail received from the terminal device of the specific member at the terminal devices of the other existing members and storing the extracted member information in the storages of the terminal devices;

transmitting contact mail including the member information of the existing members to the terminal device of the new member from the terminal devices of the existing members via the communications network;

receiving the contact mail at the terminal device of the new member; and extracting the member information of the existing members from the received contact mail at the terminal device of the new member and storing the extracted member information in the storage as a plurality of entries, wherein each entry is generated in response to an individual contact mail received from an associated individual terminal device of an existing member, other than the specific member, wherein a group ID, indicating the group exchanging the mail, is added to the mail to be exchanged among the terminal devices of the members belonging to the group, the group ID including user identification information of the terminal device of a member who forms the group and including a time when the group is formed, and wherein the group ID is a unique identifier for each group, is generated at the terminal device of the member who forms the group, and is generated exclusively by the terminal device.

20. The mail exchange method according to claim 19, further comprising transmitting withdrawal mail including information, indicating that a member corresponding to one of the terminal devices is withdrawing from the group, to the other of the terminal devices from the withdrawing terminal device according to the stored member information;

wherein the withdrawal mail is received at each of the other of the terminal devices; and wherein the member information corresponding to the received withdrawal mail is deleted from the member information storage of each of the other of the terminal devices.

21. The method according to claim 19, wherein the group ID consists essentially of the user identification information of the terminal device of the member who forms the group and at least one of the time when the group is formed and a date when the group is formed.

22. A computer-readable storage medium on which a program to be executed by each mail exchange terminal is recorded to exchange mail among a plurality of mail exchange terminal devices connected to one another via a communications network, said program causing a computer to execute:

storing member information of existing members, who belong to a group for exchanging mail, in a memory;

causing a communications device to receive a contact mail, including member information of a member who newly joins the group, from another mail exchange terminal device via the communications network;

extracting the member information included in the received contact mail and storing the extracted member information in the memory; and causing the communications device to transmit invite mail, including self-member information, to a mail exchange terminal device of the newly joining member via the communications network, whereby the mail exchange terminal device of the newly joining member generates entries in a member list by extracting the self-member information from the invite mail received from the communications device, the invite mail being received from existing members other than a specific member that sent a participation invitation mail to the mail exchange terminal device of the newly joining member, wherein a group ID, indicating the group exchanging the mail, is added to the mail to be exchanged among the terminal devices of the members belonging to the group, the group ID including user identification information of the terminal device of a member who forms the group and including a time when the group is formed, and wherein the group ID is a unique identifier for each group, is generated at the terminal device of the member who forms the group, and is generated exclusively by the terminal device.

23. The computer-readable storage medium according to claim 22, wherein the group ID consists essentially of the user identification information of the terminal device of the member who forms the group and at least one of the time when the group is formed and a date when the group is formed.

24. A computer-readable storage medium including a program to be executed by each of a plurality of mail exchange terminal devices to exchange mail among the plurality of mail exchange terminal devices connected to one another via a communications network, said program causing a computer to execute:

storing member information of existing members, who belong to a group for exchanging mail, in a memory;

causing a communications device to receive a contact mail, including member information of a member who newly joins the group, from a mail exchange terminal device of a newly joining member via the communications network;

extracting the member information included in the received contact mail and storing the extracted member information in the memory; and causing the communications device to transmit new member mail including the member information of the newly joining member to a plurality of mail exchange terminal devices of the existing members stored in the memory via the communications network, whereby the mail exchange terminal device of the newly joining member generates entries in a member list by extracting member information from contact mail received from the plurality of mail exchange terminal devices of the existing members, the existing members being other than a specific member that sent an invite mail to the mail exchange terminal device of the newly joining member, wherein a group ID, indicating the group exchanging the mail, is added to the mail to be exchanged among the terminal devices of the members belonging to the group, the group ID including user identification information of the terminal device of a member who forms the group and including a time when the group is formed, and wherein the group ID is a unique identifier for each group, is generated at the terminal device of the member who forms the group, and is generated exclusively by the terminal device.

25. A computer-readable storage medium including a program to be executed by each of a plurality of mail exchange terminal devices to exchange mail among the plurality of mail exchange terminal devices connected to one another via a communications network, said program causing a computer to execute:

causing a communications device to receive an invitation mail inviting participation in a group, previously formed by users of other mail exchange terminal devices, from another mail exchange terminal device of a specific member via the communications network;

causing the communications device to transmit participation mail, including self-member information of a newly joining member, to the mail exchange terminal device of the specific member via the communications network at the time of joining the group where participation was invited by the received invitation mail;

causing the communications device to receive contact mail, which is transmitted from mail exchange terminal devices of other existing members via the communications network in response to the participation mail transmitted to the mail exchange terminal device of the specific member, and includes member information of the other existing members; and storing member information of members, who belong to the group, in the memory based on the received invitation mail and the received contact mail, by extracting self-member information from the contact mail and generating an entry in a memory list for a member corresponding to the extracted self-member information, the received contact mail being received from the mail exchange terminal devices of the other existing members, other than the mail exchange terminal device of the specific member, wherein a group ID, indicating the group exchanging the mail, is added to the mail to be exchanged among the terminal devices of the members belonging to the group, the group ID including user identification information of the terminal device of a member who forms the group and including a time when the group is formed, and wherein the group ID is a unique identifier for each group, is generated at the terminal device of the member who forms the group, and is generated exclusively by the terminal device.

26. A computer-readable storage medium including a program to be executed by each of a plurality of mail exchange terminal devices to exchange mail among the plurality of mail exchange terminal devices connected to one another via a communications network, wherein each mail exchange terminal device comprises a communications device, said program causing a computer to execute:

storing member information of existing members, who belong to a group for exchanging mail, in a memory;

transmitting mail to mail exchange terminal devices of other members, who belong to the group, via the communications network according to the stored member information;

causing the communications device to transmit a withdrawal mail, including information of withdrawal from the group, to the mail exchange terminal devices of the other members according to the stored member information via the communications network;

causing the communications device to receive the withdrawal mail, including information indicating that another member is withdrawing from the group, from another mail exchange terminal device via the communications network; and deleting member information of all members from the member information storage belonging to the group in response to the communications device transmitting the withdrawal mail, and deleting member information of the another member from the memory in response to the communications device receiving the withdrawal mail indicating that another member is withdrawing from the group, wherein a group ID, indicating the group exchanging the mail, is added to the mail to be exchanged among the terminal devices of the members belonging to the group, the group ID including user identification information of the terminal device of a member who forms the group and including a time when the group is formed, and wherein the group ID is a unique identifier for each group, is generated at the terminal device of the member who forms the group, and is generated exclusively by the terminal device.

27. A computer readable medium for storing a program to be executed by each of a plurality of mail exchange terminal devices to exchange mail among the plurality of mail exchange terminal devices connected to one another via a communications network, wherein the computer readable medium comprises:

a storing code segment that stores member information of existing members, who belong to a group for exchanging mail in a memory;

a causing code segment that causes a communications device to receive a contact mail including member information of a member, who newly joins the group, from another mail exchange terminal device via the communications network;

an extracting code segment that extracts the member information included in the received contact mail stores the extracted member information in the memory; and a causing code segment that causes the communications device to transmit invite mail, including self-member information, to a mail exchange terminal device of the newly joining member via the communications network, whereby the mail exchange terminal device of the newly joining member generates entries in a member list by extracting member information from invite mail received from a plurality of mail exchange terminal devices of existing members, the existing members being other than a specific member that sent a participation invitation mail to the mail exchange terminal device of the newly joining member, wherein a group ID, indicating the group exchanging the mail, is added to the mail to be exchanged among the terminal devices of the members belonging to the group, the group ID including user identification information of the terminal device of a member who forms the group and including a time when the group is formed, and wherein the group ID is a unique identifier for each group, is generated at the terminal device of the member who forms the group, and is generated exclusively by the terminal device.

28. A computer readable medium for storing a program to be executed by each of a plurality of mail exchange terminal devices to exchange mail among the plurality of mail exchange terminal devices connected to one another via a communications network, wherein the computer readable medium comprises:

a storing code segment that stores member information of existing members, who belong to a group for exchanging mail, in a memory;

a causing code segment that causes a communications device to receive a contact mail, including member information of a member who newly joins the group, from a mail exchange terminal device of the newly joining member via the communications network;

an extracting code segment that extracts the member information included in the received contact mail and stores the extracted member information in the memory; and a causing code segment that causes the communications device to transmit new member mail, including the member information of the newly joining member, to a plurality of mail exchange terminal devices of the existing members via the communications network, whereby the mail exchange terminal device of the newly joining member generates entries in a member list by extracting member information from contact mail received from the plurality of mail exchange terminal devices of the existing members, the existing members being other than a specific member that sent an invitation mail to the mail exchange terminal device of the newly joining member, wherein a group ID, indicating the group exchanging the mail, is added to the mail to be exchanged among the terminal devices of the members belonging to the group, the group ID including user identification information of the terminal device of a member who forms the group and including a time when the group is formed, and wherein the group ID is a unique identifier for each group, is generated at the terminal device of the member who forms the group, and is generated exclusively by the terminal device.

29. A computer readable medium for storing a program to be executed by each of a plurality of mail exchange terminal devices to exchange mail among the plurality of mail exchange terminal devices connected to one another via a communications network, wherein the computer readable medium comprises:

a causing code segment that causes a communications device to receive an invitation mail inviting participation in a group, previously formed by users of other mail exchange terminal devices, from a mail exchange terminal device of a specific member via the communications network;

a causing code segment that causes the communications device to transmit participation mail, including self-member information of a newly joining member, to the mail exchange terminal device of the specific member via the communications network at the time of joining the group where participation was invited by the received invitation mail;

a causing code segment that causes the communications device to receive contact mail, which is transmitted from mail exchange terminal devices of other existing members via the communications network in response to the participation mail being transmitted to the mail exchange terminal device of the specific member, wherein the contact mail includes member information of the other existing members; and a storing code segment that stores member information of members, who belong to the group, in a memory based on the received invitation mail and the received contact mail, by extracting self-member information from the contact mail and generating an entry in a memory list for a member corresponding to the extracted self-member information, the received contact mail being received from the mail exchange terminal devices of the other existing members, other than the mail exchange terminal device of the specific member, wherein a group ID, indicating the group exchanging the mail, is added to the mail to be exchanged among the terminal devices of the members belonging to the group, the group ID including user identification information of the terminal device of a member who forms the group and including a time when the group is formed, and wherein the group ID is a unique identifier for each group, is generated at the terminal device of the member who forms the group, and is generated exclusively by the terminal device.

30. A computer readable medium for storing a program to be executed by each mail exchange terminal device to exchange mail among a plurality of mail exchange terminal devices connected to one another via a communications network, wherein each mail exchange terminal device comprises a communications device, the computer readable medium comprising:

a storing code segment that stores member information of existing members, who belong to a group for exchanging mail, in a memory;

a transmitting code segment that transmits mail to mail exchange terminal devices of other members, who belong to the group, via the communications network according to the stored member information;

a causing code segment that causes the communications device to transmit a withdrawal mail, including information of withdrawal from the group, to the mail exchange terminal devices of the other members according to the stored member information via the communications network;

a causing code segment that causes the communications device to receive the withdrawal mail, including information indicating that another member is withdrawing from the group, from another mail exchange terminal device via the communications network; and a deleting code segment that deletes member information of all members from the member information storage belonging to the group in response to the communications device transmitting the withdrawal mail, and deleting member information of the another member from the memory in response to the communications device receiving the withdrawal mail indicating that the another member is withdrawing from the group, wherein a group ID, indicating the group exchanging the mail, is added to the mail to be exchanged among the terminal devices of the members belonging to the group, the group ID including user identification information of the terminal device of a member who forms the group and including a time when the group is formed, and wherein the group ID is a unique identifier for each group, is generated at the terminal device of the member who forms the group, and is generated exclusively by the terminal device.

* * * * *